United States Patent
Hiller

(10) Patent No.: US 11,236,667 B2
(45) Date of Patent: Feb. 1, 2022

(54) FLAP DEVICE FOR OPENING AND CLOSING A WASTEGATE CHANNEL IN A TURBINE HOUSING OF A TURBOCHARGER, TURBOCHARGER, AND METHOD FOR PRODUCTION

(71) Applicant: VITESCO TECHNOLOGIES GMBH, Hannover (DE)

(72) Inventor: Marc Hiller, Alzey (DE)

(73) Assignee: Vitesco Technologies GmbH, Hannover (DE)

( * ) Notice: Subject to any disclaimer, the term of this patent is extended or adjusted under 35 U.S.C. 154(b) by 566 days.

(21) Appl. No.: 16/320,501

(22) PCT Filed: Jul. 12, 2017

(86) PCT No.: PCT/EP2017/067541
§ 371 (c)(1),
(2) Date: Jan. 25, 2019

(87) PCT Pub. No.: WO2018/019589
PCT Pub. Date: Feb. 1, 2018

(65) Prior Publication Data
US 2020/0370469 A1     Nov. 26, 2020

(30) Foreign Application Priority Data

Jul. 27, 2016   (DE) .......................... 102016213770.0

(51) Int. Cl.
*F02B 37/18*     (2006.01)
*F16K 1/20*      (2006.01)

(52) U.S. Cl.
CPC .......... *F02B 37/186* (2013.01); *F16K 1/2007* (2013.01)

(58) Field of Classification Search
CPC .... F02B 37/186; F02B 37/183; F16K 1/2007; Y02T 10/12
See application file for complete search history.

(56) References Cited

U.S. PATENT DOCUMENTS

| | | | |
|---|---|---|---|
| 9,175,578 B2 | 11/2015 | Igarashi et al. | |
| 9,464,563 B2 | 10/2016 | Eden et al. | |
| 10,125,672 B2 | 11/2018 | Goeckelmann et al. | |
| 2016/0178028 A1 | 6/2016 | Lummer et al. | |

FOREIGN PATENT DOCUMENTS

| | | |
|---|---|---|
| CN | 102822472 A | 12/2012 |
| CN | 203626952 U | 6/2014 |
| CN | 105715362 A | 6/2016 |
| DE | 202010005747 U1 | 9/2010 |

(Continued)

*Primary Examiner* — Audrey B. Walter
*Assistant Examiner* — Edward Bushard
(74) *Attorney, Agent, or Firm* — Laurence A. Greenberg; Werner H. Stemer; Ralph E. Locher

(57) ABSTRACT

A flap configuration opens and closes a wastegate channel in a turbine housing of a turbocharger. The flap configuration has a lever element having a through-bore in which a cylindrical bushing is arranged. A flap having a pin is arranged on the lever element such that the pin passes through the bushing. A cover disk is arranged on an opposite side from the flap and has an opening through which the pin of the flap passes. The flap is riveted to the lever element by the pin.

9 Claims, 7 Drawing Sheets

(56) References Cited

FOREIGN PATENT DOCUMENTS

| DE | 102010055382 | A1 |   | 6/2012  |          |
|----|--------------|----|---|---------|----------|
| DE | 102011075201 | A1 | * | 11/2012 | F02B 37/186 |
| DE | 102011075201 | A1 |   | 11/2012 |          |
| DE | 102012201011 | A1 |   | 7/2013  |          |
| DE | 102012216893 | A1 |   | 4/2014  |          |
| DE | 102015209042 | A1 |   | 11/2016 |          |
| JP |    2005226591 | A  |   | 8/2005  |          |
| WO |    2010133293 | A2 |   | 11/2010 |          |

* cited by examiner

FLAP DEVICE FOR OPENING AND CLOSING A WASTEGATE CHANNEL IN A TURBINE HOUSING OF A TURBOCHARGER, TURBOCHARGER, AND METHOD FOR PRODUCTION

BACKGROUND OF THE INVENTION

Field of the Invention

The invention relates to a flap device for opening and closing a wastegate duct in a turbine housing of a turbocharger. The invention furthermore relates to a turbocharger for an internal combustion engine and to a method.

Exhaust-gas turbochargers are being increasingly used to increase power in motor-vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, i.e. the power of the internal combustion engine can be increased.

To this end, the exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine rotor arranged therein, which is driven by the exhaust-gas mass flow. The fresh-air compressor has a compressor housing and a compressor rotor arranged therein, which builds up a boost pressure. The turbine rotor and the compressor rotor are arranged for conjoint rotation on the opposite ends of a common shaft, referred to as the rotor shaft, and thus form what is referred to as the turbocharger rotor. The rotor shaft extends axially between the turbine rotor and compressor rotor through the rotor bearing arranged between the exhaust-gas turbine and fresh-air compressor, and is provided in said rotor bearing with rotary support in the radial and axial directions in relation to the rotor shaft axis. According to this construction, the turbine rotor driven by the exhaust-gas mass flow drives the compressor rotor via the rotor shaft, thereby increasing the pressure in the intake tract of the internal combustion engine, based on the fresh-air mass flow downstream of the fresh-air compressor, and thereby ensures better filling of the combustion chamber with atmospheric oxygen.

In exhaust-gas turbochargers, the speed and power of the turbine are frequently regulated in that a wastegate valve is opened and closed in a regulated manner in order to conduct a part of the exhaust gas past the turbine via a wastegate duct. This wastegate valve typically has a flap device and usually consists of several parts.

SUMMARY OF THE INVENTION

One object underlying the invention is to specify a concept for a flap device of a turbocharger, said flap device allowing efficient sealing of the wastegate duct and at the same time being able to be operated particularly quietly.

A flap device for opening and closing a wastegate duct in a turbine housing of a turbocharger is disclosed. The flap device has a lever element having a through-bore in which a cylindrical bushing is arranged. Also provided is a flap having a pin, said flap being arranged on the lever element such that the pin passes through the bushing. Also provided is a cover disk which is arranged on an opposite side from the flap and has an opening through which the pin of the flap passes. The flap is riveted to the lever element by means of the pin.

The flap device can be referred to as part of a wastegate valve, which represents a bypass valve device on a turbine side of a turbocharger. The flap is for example a flap plate, which is designed and configured to rest on a wastegate valve seat. Integrally formed on the flap plate or on the flap is the pin. The pin is arranged on a side of the flap that faces the lever, and extends substantially normally from the flap through the through-bore of the lever element. The flap having the pin can also be referred to as a rivet.

The lever element is for example part of a rotatable spindle which can be actuated in a known manner via an actuator. As a result, the flap is actuable between a closed position, in which it rests on a valve seat in order to seal off the wastegate duct, and an open position, in which the wastegate duct is at least partially cleared. The lever element is arranged in the region of the through-bore between the cover disk and the flap, or that side of the flap that faces the lever element. The bushing is arranged between the pin and the through-bore, or an inner wall of the through-bore. During riveting, that part of the pin that protrudes through the cover disk is riveted, such that a form-fitting connection between the pin and the cover disk is achieved. The lever element is then enclosed between the cover disk and the flap.

In principle, axial and radial clearances are necessary in flap devices in order to compensate manufacturing tolerances and/or deformations during operation of a turbocharger, for instance thermally induced deformations, and to be able to reliably close and open the wastegate duct. However, the provision of the bushing makes it possible, in contrast to arrangements without a bushing, to provide very small clearances, for instance axial and radial clearances, before the riveting process. As a result, although a necessary clearance for operation can be ensured, this clearance can also be designed to be small enough for the flap device to be particularly quiet. Furthermore, an axial clearance, for instance between the flap or the flap plate and the lever element and/or between the lever element and the cover disk, can also be formed in a particularly small and exact manner.

This also favors the abovementioned advantages. In contrast thereto, in the case of a riveting process without a bushing, particularly large clearances would be necessary, since riveting typically tends to be an imprecise and crude manufacturing process. Here and below, an axial direction means a direction which extends parallel to a bore axis of the through-bore. A radial direction relates to a radial direction perpendicular to the bore axis.

A further advantage is that it is possible to dispense with welding the pin to the cover disk. In this way, costs can be saved compared with riveting, for instance on account of complexity and the materials used, without it being necessary to dispense with the small gap dimensions, however. Furthermore, it has been found that the weld is susceptible to rupturing during operation of the turbocharger.

According to one configuration, the through-bore, the bushing and the pin are dimensioned with respect to one another such that, before riveting, a radial clearance is formed between the bushing and through-bore and between the bushing and pin. After riveting, the pin expands radially in the region of the bushing such that it partially or completely fills the bushing. The bushing itself is substantially not radially expanded by the riveting process. This contributes toward it being possible to keep the clearance between the bushing and lever element small and exact from the very start. In other words, a radial clearance which is as described above but is designed in a particularly exact and small manner remains at least between the bushing and lever element. The radial clearance is for example 50 to 100 µm.

According to a further configuration, the cover disk rests on the bushing. As a result, the axial clearance between the components can be embodied in a smaller and exact manner. Among other things, this is because the cover disk is supported on the bushing during the forming process and the rivet, for instance the pin, has been axially released from the bushing during the riveting process.

According to a further configuration, the cover disk and the bushing are formed in one piece. This contributes toward easier assembly since there are fewer components. Furthermore, the cover disk rests in a more precise position.

According to a further configuration, the bushing has at least one groove, which is arranged preferably at the outer periphery of the bushing and extends in the axial direction of the bushing, and into which a spring sheet has been introduced such that a radial clamping force of the spring sheet acts between the through-bore and the bushing. In other words, the spring sheet allows a radial spring action between the lever element and the bushing. The term "introduce" is understood to mean for example plugging in, inserting or arranging forming a form-fit. The spring sheet may have been prebent. The spring sheet protrudes radially and/or axially from the bushing at least in part. This type of force fit ensures that the parts no longer lie loosely one in the other. Noise such as the initially mentioned clattering is avoided or reduced particularly efficiently. Alternatively, it is also possible for there to be several grooves and, correspondingly thereto, several spring sheets. Preferably, at least three spring sheets or more are provided. The groove may also be referred to as a slot. The spring sheet(s) nevertheless allow clearance and deformation compensation during the operation of the flap device.

According to a further configuration, the spring sheet is formed and/or has been introduced into the groove such that said spring sheet protrudes at at least one axial end of the bushing with regard to an axial direction of extension of the bushing in a mounted state before riveting, and an axial clamping force of the spring sheet acts with regard to the axial direction of extension after riveting.

For example, the spring sheet is formed in a diamond-shaped, trapezoidal or similar manner. The spring sheet is thus clamped with regard to the axial direction of extension in the riveted state. For example, the spring sheet is clamped between the cover disk and the flap plate or between the cover disk and the bushing itself. This contributes particularly well to the avoidance or suppression of noise, as described above. Analogously to above, there is clearance and deformation compensation. Alternatively, the spring sheet can protrude at both opposite axial ends of the bushing.

Depending on the configuration, the groove can extend continuously in the entire axial direction of extension of the bushing or only partially.

Furthermore, a turbocharger for an internal combustion engine is disclosed. The turbocharger has a bearing housing, in which a rotor shaft is mounted in a rotatable manner. Also provided is a turbine wheel, which is arranged for conjoint rotation on the rotor shaft. The turbocharger has a turbine housing, which is mechanically secured in the bearing housing. The turbocharger also has a wastegate duct, which is formed in the turbine housing. Finally, a flap device according to one of the above-described configurations is provided, which is designed to open and close the wastegate duct.

The turbocharger allows substantially the abovementioned advantages and functions.

Furthermore, a method for producing a flap device according to one of the above-described configurations is described. The method has the following steps of:
  providing a lever element having a through-bore;
  introducing a bushing into the through-bore in the lever element;
  providing a flap having a pin;
  arranging the flap on the lever element such that the pin passes through the bushing;
  placing a cover disk on an opposite side from the flap such that the pin projects through an opening in the cover disk;
  riveting the flap to the lever element by means of the projecting pin.

The method allows substantially the abovementioned advantages and functions. The abovementioned features and functions also apply to the described method.

According to one configuration, after the flap has been arranged on the lever element, a respective radial clearance is formed between the pin and the bushing and between the bushing and the through-bore. As a result, during the riveting of the pin, the pin is expanded within the bushing and fills the bushing. The bushing itself is substantially not radially expanded by the riveting process. As a result, the advantages and functions mentioned at the beginning are made possible.

According to a further configuration, the bushing has at least one groove. Before the bushing is introduced into the through-bore, a spring sheet is introduced into the groove and the bushing is introduced into the through-bore together with the spring sheet, such that a radial clamping force acts between the through-bore and the bushing. For example, the spring sheet is bent by the exertion of a force against the bushing such that the bushing can be pushed into the through-bore together with the spring sheet. If the force on the spring sheet is then removed, the spring sheet can expand within the clearance between the bore and bushing. This contributes toward the parts no longer lying loosely one in the other and noise such as clattering is avoided or considerably reduced.

According to a further configuration, the spring sheet is formed and/or has been introduced into the groove such that before riveting the spring sheet protrudes at least partially at an axial end of the bushing, and during riveting the spring sheet is axially clamped and an axial clamping force of the spring sheet acts with regard to an axial direction of extension of the bushing. As a result, the advantages and functions mentioned at the beginning are made possible.

Optionally, the spring sheet(s) can also have been prebent or preformed in a step before they are introduced into the grooves.

Further advantages and functions are disclosed in the following detailed description of an exemplary embodiment.

The exemplary embodiment is described in the following text with the aid of the appended figures. Elements that are of identical type or act identically are provided with the same reference signs throughout the figures.

DESCRIPTION OF THE INVENTION

Figure 1:
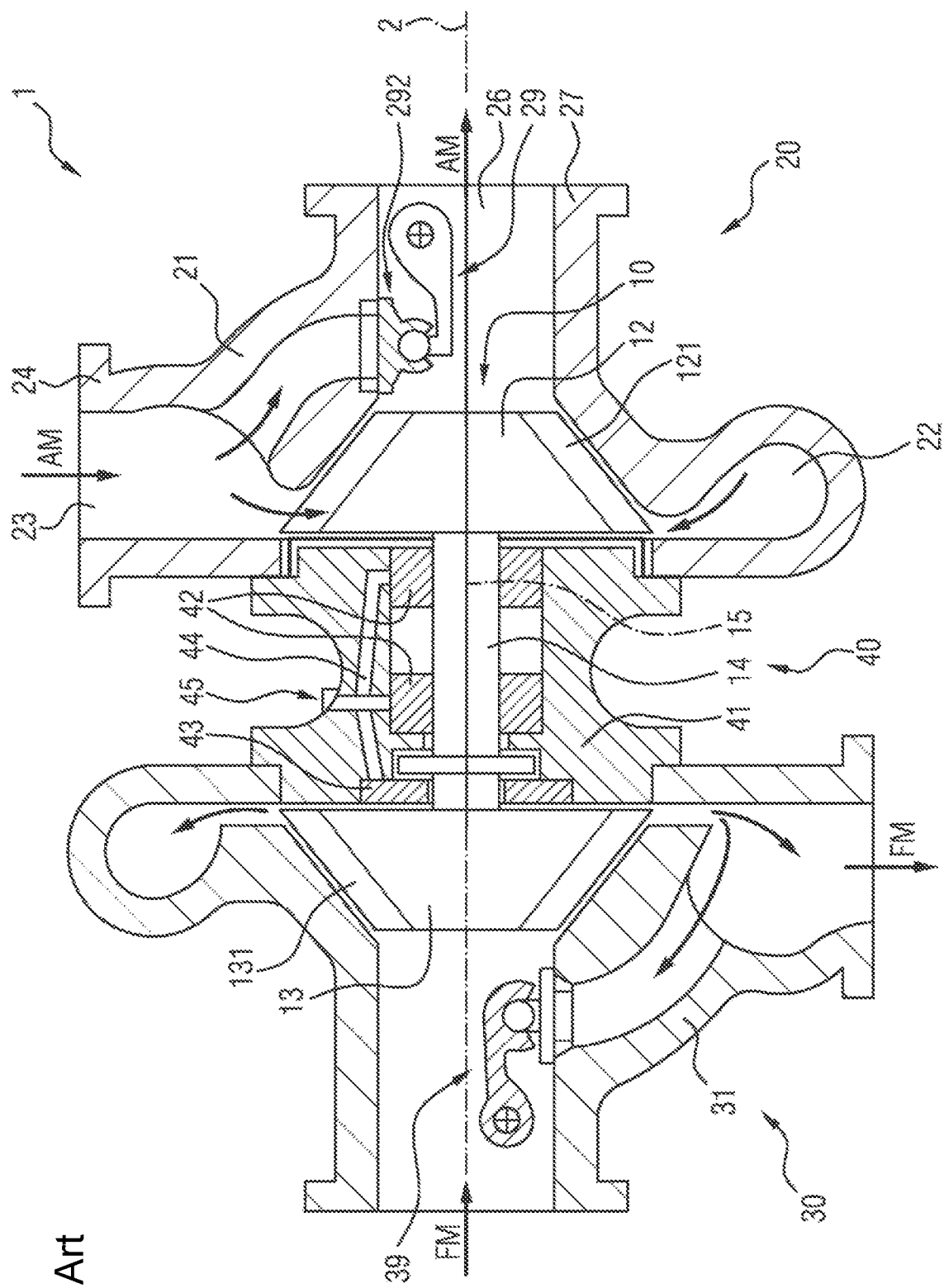
FIG. 1 shows a schematic sectional view of a turbocharger.

FIG. 1 schematically shows a sectional illustration of an example of an exhaust-gas turbocharger 1, which comprises an exhaust-gas turbine 20, a fresh-air compressor 30 and a rotor bearing 40. The exhaust-gas turbine 20 is equipped with a wastegate valve 29 and an exhaust-gas mass flow AM is indicated by arrows. The fresh-air compressor 30 has an overrun air recirculation valve 39 and a fresh-air mass flow FM is likewise indicated by arrows. A turbocharger rotor 10, as it is known, of the exhaust-gas turbocharger 1 has a turbine rotor 12 (also referred to as turbine wheel), a compressor rotor 13 (also referred to as compressor wheel) and a rotor shaft 14 (also referred to as shaft). The turbocharger rotor 10 rotates about a rotor axis of rotation 15 of the rotor shaft 14 during operation. The rotor axis of rotation 15 and at the same time the turbocharger axis 2 (also referred to as longitudinal axis) are illustrated by the indicated centerline and identify the axial orientation of the exhaust-gas turbocharger 1. The turbocharger rotor 10 is supported with its rotor shaft 14 by means of two radial bearings 42 and one axial bearing washer 43. Both the radial bearings 42 and the axial bearing washer 43 are supplied with lubricant via oil supply ducts 44 of an oil connection 45.

As a rule, a conventional exhaust-gas turbocharger 1, as illustrated in FIG. 1, has a multipart construction. Here, a turbine housing 21 that is arrangeable in the exhaust tract of the internal combustion engine, a compressor housing 31 that is arrangeable in the intake tract of the internal combustion engine, and, between the turbine housing 21 and compressor housing 31, a bearing housing 41 are arranged alongside one another with respect to the common turbocharger axis 2 and connected together in terms of assembly.

A further structural unit of the exhaust-gas turbocharger 1 is represented by the turbocharger rotor 10, which has the rotor shaft 14, the turbine rotor 12, arranged in the turbine housing 21, having rotor blading 121, and the compressor rotor 13, arranged in the compressor housing 31, having rotor blading 131. The turbine rotor 12 and the compressor rotor 13 are arranged on the opposite ends of the common rotor shaft 14 and connected for conjoint rotation thereto. The rotor shaft 14 extends in the direction of the turbocharger axis 2 axially through the bearing housing 41 and is provided therein with rotary support in the axial and radial directions about its longitudinal axis, the rotor axis of rotation 15, wherein the rotor axis of rotation 15 lies on the turbocharger axis 2, i.e. coincides therewith.

The turbine housing 21 has one or more exhaust-gas annular ducts, referred to as exhaust-gas channels 22, that are arranged annularly around the turbocharger axis 2 and the turbine rotor 12 and narrow helically toward the turbine rotor 12. These exhaust-gas channels 22 each have their own or a common exhaust-gas feed duct 23, directed tangentially outward, with a manifold connection branch 24 for connecting to an exhaust-gas manifold (not illustrated) of an internal combustion engine, through which the exhaust-gas mass flow AM flows into the particular exhaust-gas channel 22 and then onto the turbine rotor 12. The turbine housing 21 furthermore has an exhaust-gas discharge duct 26, which extends away from the axial end of the turbine rotor 12 in the direction of the turbocharger axis 2 and has an exhaust connection branch 27 for connecting to the exhaust system (not illustrated) of the internal combustion engine. Via this exhaust-gas discharge duct 26, the exhaust-gas mass flow AM emerging from the turbine rotor 12 is discharged into the exhaust system of the internal combustion engine.

Turbines and compressors are turbomachines and have, on account of physical laws, an optimal operating range, dependent in each case on the overall size and design, which is characterized by the mass flow rate, the pressure ratio and the speed of the particular rotor. In contrast thereto, the operation of an internal combustion engine in a motor vehicle is characterized by dynamic changes in the load and the operating range.

In order now to be able to adapt the operating range of the exhaust-gas turbocharger 1 to changing operating ranges of the internal combustion engine and thus to ensure a desired response behavior as far as possible without noticeable decelerations (turbo lag), exhaust-gas turbochargers are equipped with additional functions, for example what are known as variable turbine geometries (VTG) or wastegate devices (WG) on the exhaust-gas or turbine side and overrun air recirculation or blow-off devices on the feed-air or compressor side. These serve to minimize the inert behavior and thus the decelerated response behavior of the turbocharger and to avoid damaging operating states.

A corresponding bypass-valve device on the turbine side is referred to as a wastegate valve 29. The wastegate valve 29 connects the exhaust-gas feed duct 23, upstream of the turbine rotor 12 in the direction of flow of the exhaust-gas mass flow AM, to the exhaust-gas discharge duct 26, downstream of the turbine rotor 12 in the direction of flow of the exhaust-gas mass flow AM, via a wastegate duct 291 in the turbine housing 21. The wastegate valve 29 can be opened or closed via a closing device, for example a flap device 292. At a low speed and the correspondingly low exhaust-gas mass flow rate AM of the internal combustion engine, the wastegate valve 29 is closed and the entire exhaust-gas mass flow AM is conducted via the turbine rotor 12. This ensures an adequate speed of the turbine and compressor rotors 12, 13 and thus an adequate pressure build-up by the compressor even at a low speed of the internal combustion engine. At a high speed and correspondingly high exhaust-gas mass flow rate AM of the internal combustion engine, the wastegate valve 29 is then opened and at least a part of the exhaust-gas mass flow AM is conducted past the turbine rotor 12 directly into the exhaust-gas discharge duct 26 downstream of the turbine rotor 12 in the direction of flow, in order to keep the speed of the turbine and compressor rotors and also the pressure ratio, in particular at the exhaust-gas turbine 20, within the desired working range of the exhaust-gas turbocharger.

Further details of the turbocharger 1 are not explained more specifically.

Figure 2A:
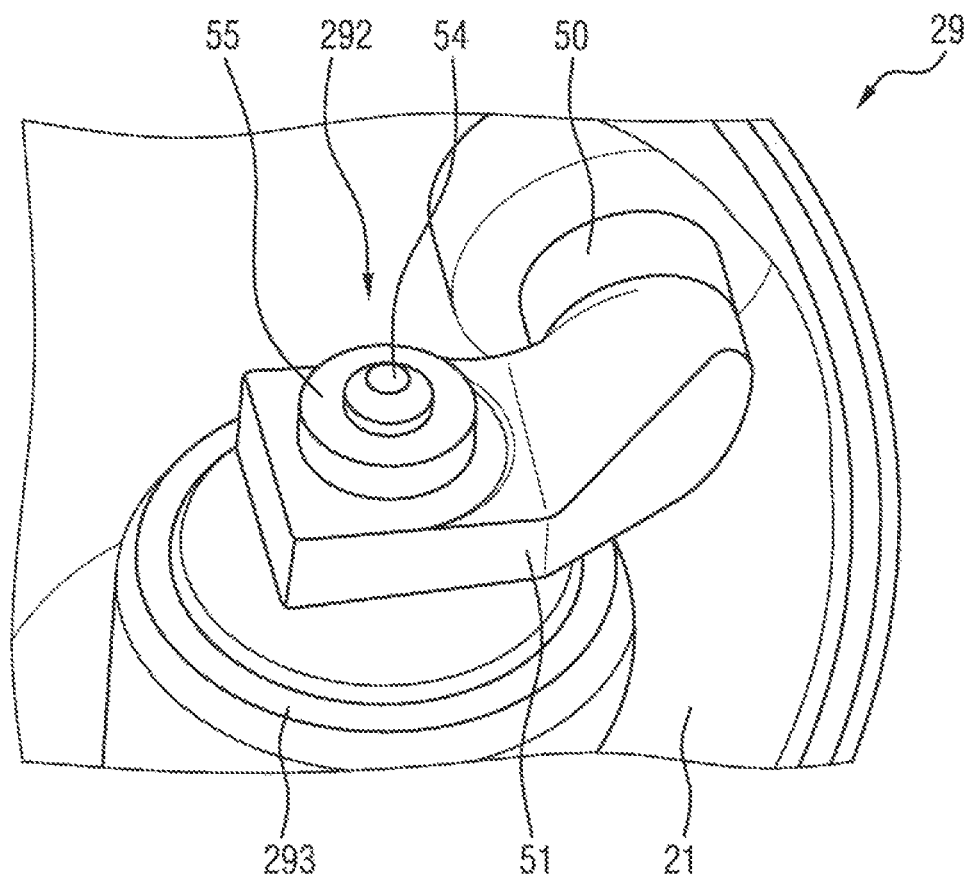
FIGS. 2A and 2B show schematic views of a flap device according to one exemplary embodiment.
Figure 2B:
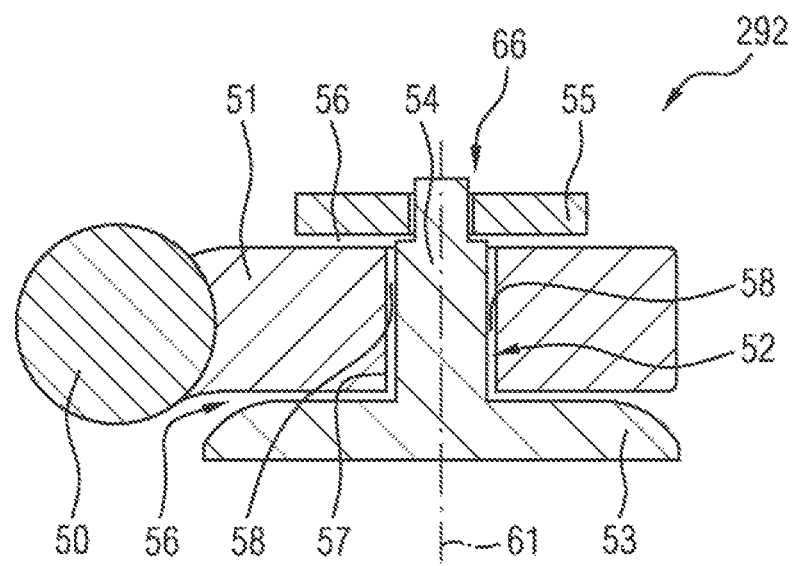

FIGS. 2A and 2B schematically show a perspective partial view and a cross-sectional view of a flap device 292 according to one exemplary embodiment, wherein FIG. 2A shows a fully mounted and riveted state and FIG. 2B shows a mounting state before riveting.

The flap device 292 is in a multipart form and has a spindle 50, which has an internal lever element 51. The lever element 51 is thus part of the spindle 50. Formed in the lever element 51 is a cylindrical through-bore 52, for instance a hole, into which a flap 53, which can also be referred to as a wastegate flap or flap plate, passes by means of a cylindrical pin 54.

The through-bore 52 has a bore axis 61. Placed on an opposite side from the flap plate 53 is a cover disk 55, through which the pin 54 passes via an opening 66 in an axial direction. The flap plate 53 is riveted to the lever element 51 via the pin 54 and the cover disk 55, such that a form-fitting connection between the pin 54 and the disk 55 arises (shown in FIG. 2A). The lever element 51 is then enclosed between the disk 55 and the surface, lying parallel thereto, of the flap 53.

The lever element 51 is rotatable via the spindle 50, such that the flap plate 53 is movable between a closed position and an open position. In the closed position shown in FIG. 2, the flap plate 53 rests in the manner of a surface-to-surface connection on a wastegate valve seat 293.

Between the disk 55 or the flap plate 53 and the lever element 51 there is an axial clearance 56, and between the pin 54 and the lever element 51, for instance an inner wall 57 of the through-bore 52, there is a radial clearance 58, these clearances subsequently allowing, in the installed state and during operation of the turbocharger 1, a certain tolerance and thermal-deformation compensation between the parts when the wastegate valve 29 closes and in the process the flap plate 53 rests on the wastegate valve seat 293 in as level a manner as possible. The radial and axial clearance is intended to be large enough to compensate the tolerances and deformations. At the same time, however, it should also be as small as possible, since it has an effect on the acoustic properties. The larger the clearance, the louder any clattering, rattling, vibration or the like is perceived to be during operation. These acoustic interfering noises should be minimized. Since the riveting process itself now axially compresses the pin 54, the pin 54 expands radially in the through-bore 52 in the lever element 51. A diameter of the pin 54 becomes larger during the riveting process. Accordingly, sufficient clearance has to be maintained between the components. The riveting process itself is subject to considerable fluctuations, and so the tolerance band has to be correspondingly large and the risk of acoustic anomalies is then increased. In addition the susceptibility to wear of the components is increased with a large clearance.

Figure 3:
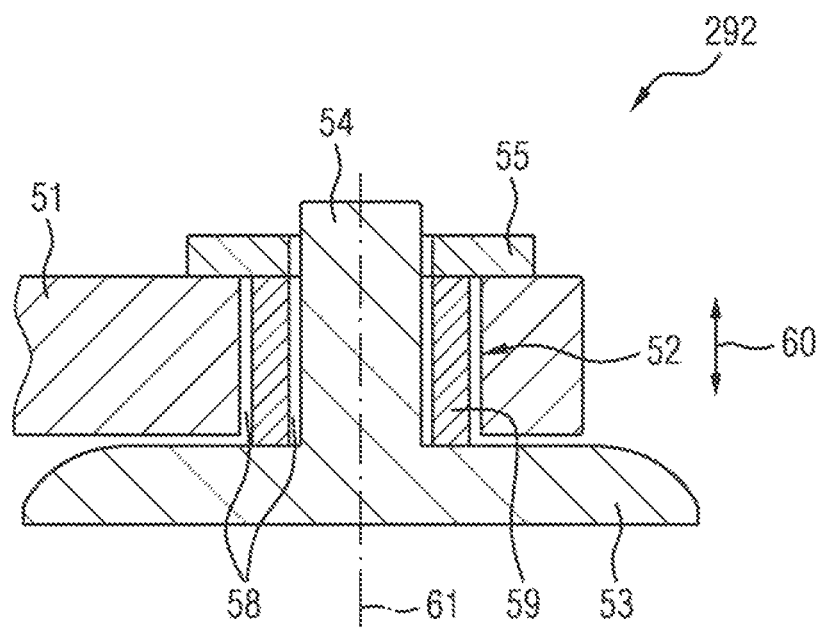
FIG. 3 shows a schematic partial view of a cross section through a flap device according to one exemplary embodiment of the invention.

FIG. 3 shows an improved flap device 292 according to a first exemplary embodiment of the invention, which is of substantially identical construction. In the flap device 292, a cylindrical, hollow bushing 59 has been introduced into the through-bore 52 between the lever element 51 and the pin 54. The bushing 59 consists for example of a material that is resistant to high temperatures. The lever element 51, or the through-bore 52 thereof, the bushing 59 and the pin 54 are dimensioned such that, before riveting, a radial clearance 58 is formed both between the lever element 51 and bushing 59 and between the bushing 59 and pin 54. The cover disk 55 rests on the bushing 59. If the pin 54 protruding from the cover disk 55 is then riveted, it is compressed with respect to an axial direction of extension 60 of the bushing 59 and, as a result of its radial expansion in the bushing 59, fills the latter. The bushing 59 is itself not expanded radially. The direction of extension 60 is parallel to the bore axis 61 of the through-bore 52. As a result, the advantages and functions mentioned at the beginning are made possible.

Figure 4:
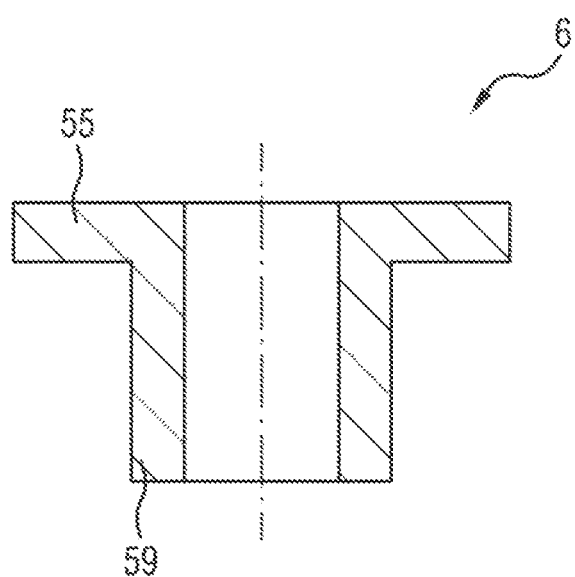
FIG. 4 shows a bushing according to a further exemplary embodiment of the invention.

FIG. 4 shows a further exemplary embodiment of the invention, wherein the cover disk 55 and the bushing 59 are formed in one piece.

Figure 5A:
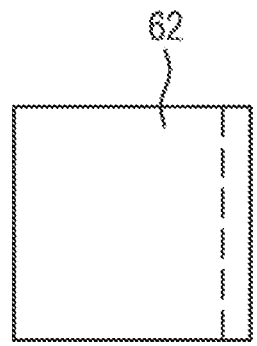
FIGS. 5A and 5B show a spring sheet according to one exemplary embodiment of the invention.
Figure 5B:
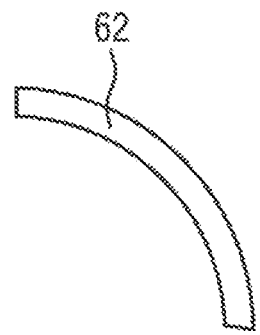
Figure 6:
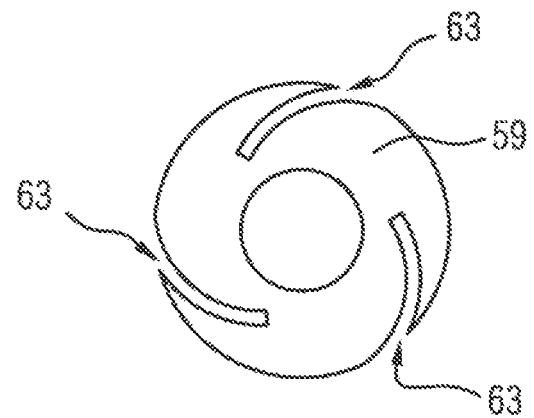
FIG. 6 shows a plan view of a bushing according to a further exemplary embodiment.
Figure 7:
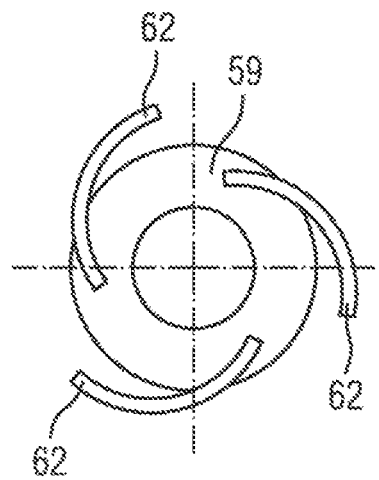
FIG. 7 shows the bushing according to FIG. 6 with mounted spring sheets according to FIGS. 5A and 5B.

FIGS. 5A to 7 show a further exemplary embodiment of the invention. FIG. 5A shows a spring sheet 62 with a rectangular shape, which is bent for example as shown in FIG. 5B in a view from above. A plurality of such spring sheets 62, for instance three as shown in the exemplary embodiment according to FIG. 7, can now be introduced or plugged into a corresponding bushing 59, wherein the bushing 59 has a plurality of grooves 63 corresponding to the spring sheets 62. The assembled state of such a bushing 59 with spring sheets 62 is shown in FIG. 7. The spring sheets 62 project out of the bushing 59 in tangential directions.

Figure 8:
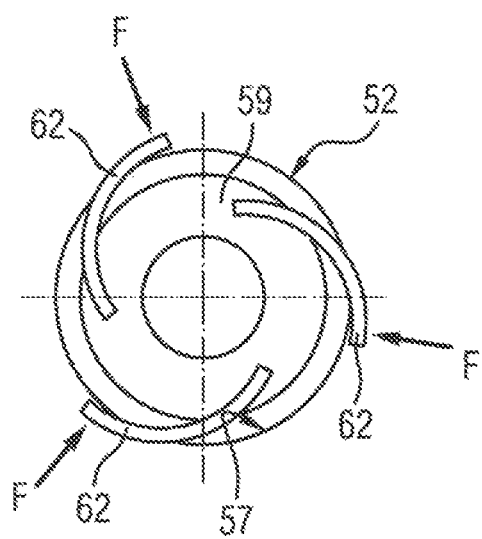
FIG. 8 shows the assembled bushing according to FIG. 7 during a mounting operation.

If a force F is now applied to the spring sheets 62 from the outside, as shown in FIG. 8, the spring sheets 62 bear against an outer side of the bushing 59 and can thus be pushed into the schematically illustrated through-bore 52. If the force F is now released, the spring sheets can strike the inner wall 57 and bring about a clamping force between the bushing and through-bore 52.

Figure 9:
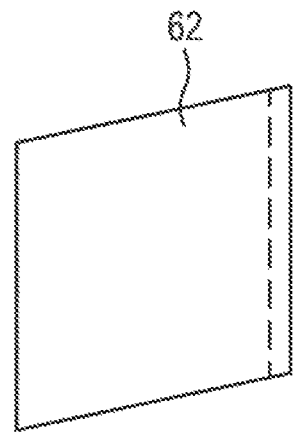
FIG. 9 shows a spring sheet according to a further exemplary embodiment.
Figure 10:
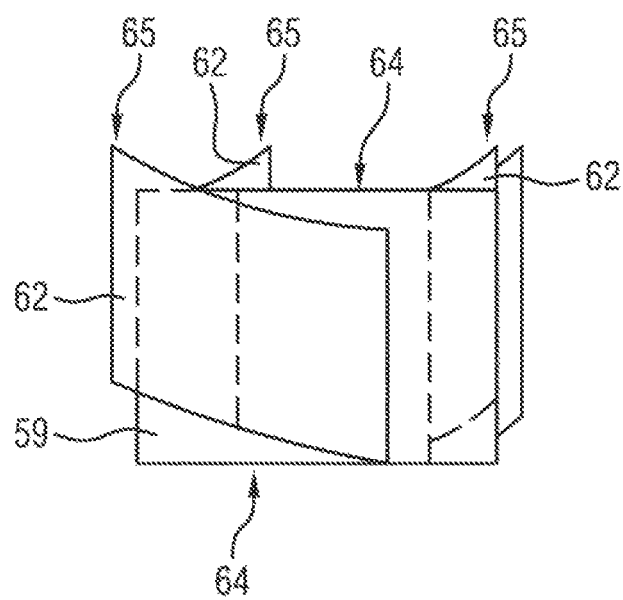
FIG. 10 shows a schematic view of a bushing with spring sheets according to FIG. 9.

FIGS. 9 and 10 schematically show a further embodiment of the described spring sheets 62, wherein the latter are configured in a diamond-shaped manner. As a result, the spring sheet 62, in the mounted state before riveting, protrudes axially beyond the bushing 59, which is schematically indicated in FIG. 10. In particular, each spring sheet 62 protrudes beyond at least one of the opposite axial ends 64 of the bushing 59. For example, one or more corner regions 65 of the spring sheets 62 protrude.

During the subsequent riveting, an axial force is exerted on the protruding regions of the spring sheets 62, such that, in addition to the above-described spring action, an axial spring action or clamping-force action is also achieved. As a result, the acoustic anomalies are additionally reduced.

Figure 11:
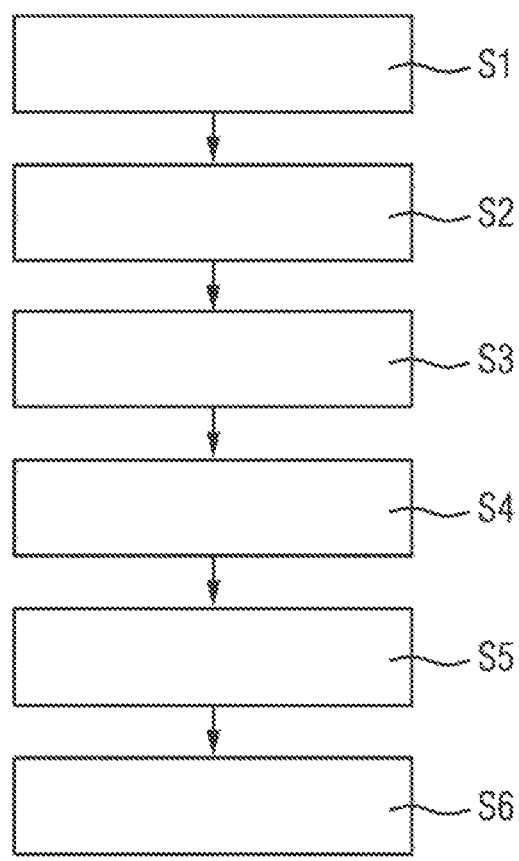
FIG. 11 shows a schematic flow chart of a production method for a flap device.

In the following text, the flow chart, shown schematically in FIG. 11, of a production method for a described flap device 292 will be discussed.

In a first step S1, the lever element 51 is provided, which has the through-bore 52.

In a further step S2, the bushing 59 is introduced, for instance plugged, into the through-bore 52.

In a further step S3, the flap 53 having the pin 54 is provided.

In a further step S4, the flap 53 is arranged on the lever element 51 by means of the pin 54, wherein the pin 54 passes through the through-bore 52. In the process, the pin 54 projects on the opposite side of the bore 52.

In a further step S5, the cover disk 55 is placed on an opposite side from the flap 53 such that the pin 54 projects through the opening 66 in the cover disk 55.

In a further step S6, the flap 53 is riveted with the lever element 51 by means of the protruding part of the pin 54.

Optionally, as described at the beginning, further steps can be provided depending on the described configurations. For example, one or more spring sheets 62 can have been introduced into the corresponding grooves 63 in the bushing 59 before the bushing 59 with the spring sheets 62 is passed as a structural unit into the through-bore 52.

It should be noted at this point that the turbocharger 1 described in FIG. 1 should be understood as being an example and can alternatively also have other configurations.

The invention claimed is:

1. A flap configuration for opening and closing a wastegate duct in a turbine housing of a turbocharger, the flap configuration comprising:
   a cylindrical bushing having at least one groove formed therein;
   a lever having a through-bore formed therein and in said through-bore said cylindrical bushing is disposed;
   a spring sheet disposed in said at least one groove such that a radial clamping force of said spring sheet acts between said through-bore and said cylindrical bushing;
   a flap having a pin disposed on said lever element such that said pin passes through said cylindrical bushing;
   a cover disk disposed on an opposite side from said flap and having an opening formed therein through which said pin of said flap passes; and
   said flap is riveted to said lever by means of said pin.

2. The flap device according to claim 1, wherein said through-bore, said cylindrical bushing and said pin are dimensioned with respect to one another such that, before riveting, a radial clearance is formed between said cylindrical bushing and said through-bore and between said cylindrical bushing and said pin.

3. The flap device according to claim 1, wherein said cover disk rests on said cylindrical bushing.

4. The flap device according to claim 1, wherein said cover disk and said cylindrical bushing are formed in one piece.

5. The flap device according to claim 1, wherein said spring sheet is formed and/or has been introduced into said groove such that said spring sheet protrudes at at least one axial end of said cylindrical bushing with regard to an axial direction of extension of said cylindrical bushing in a mounted state before riveting, and an axial clamping force of said spring sheet acts with regard to the axial direction of extension after riveting.

6. A turbocharger for an internal combustion engine, the turbocharger comprising:
   a rotor shaft;
   a bearing housing in which said rotor shaft is mounted in a rotatable manner;
   a turbine wheel disposed for conjoint rotation on said rotor shaft;
   a turbine housing mechanically secured to said bearing housing;
   a wastegate duct formed in said turbine housing; and
   a flap configuration for opening and closing said wastegate duct, said flap configuration containing:
      a cylindrical bushing having at least one groove formed therein;
      a lever having a through-bore formed therein and in said through-bore said cylindrical bushing is disposed;
      a spring sheet disposed in said at least one groove such that a radial clamping force of said spring sheet acts between said through-bore and said cylindrical bushing;
      a flap having a pin disposed on said lever element such that said pin passes through said cylindrical bushing;
      a cover disk disposed on an opposite side from said flap and having an opening formed therein through which said pin of said flap passes; and
      said flap is riveted to said lever by means of said pin.

7. A method for producing a flap configuration, which comprises the steps of:
   providing a lever having a through-bore formed therein;
   providing a bushing having at least one groove formed therein and a spring sheet disposed in the at least one groove, and introducing the bushing into the through-bore in the lever together with the spring sheet, such that a radial clamping force acts between the through-bore and the bushing;
   providing a flap having a pin;
   disposing the flap on the lever such that the pin passes through the bushing;
   placing a cover disk on an opposite side from the flap such that the pin projects through an opening in the cover disk; and
   riveting the flap to the lever by means of the pin.

8. The method according to claim 7, wherein, after the flap has been disposed on the lever, a respective radial clearance is formed between the pin and the bushing and between the bushing and the through-bore.

9. The method according to claim 7, wherein the spring sheet is formed and/or has been introduced into the groove such that before the riveting the spring sheet protrudes at least partially at an axial end of the bushing, and during the riveting the spring sheet is axially clamped and an axial clamping force of the spring sheet acts with regard to an axial direction of extension of the bushing.

* * * * *